United States Patent
Mellot et al.

(10) Patent No.: US 9,995,928 B2
(45) Date of Patent: Jun. 12, 2018

(54) OPTICAL SIGNAL GENERATION IN A SPAD ARRAY BASED ON GENERATION OF A TARGET PHASE VALUE DEPENDENT UPON AN AMBIENT COUNT RATE

(71) Applicants: STMICROELECTRONICS (RESEARCH & DEVELOPMENT) LIMITED, Marlow Bucks (GB); STMICROELECTRONICS (GRENOBLE 2) SAS, Grenoble (FR)

(72) Inventors: Pascal Mellot, Lans en Vercors (FR); Donald Baxter, Stirling (GB)

(73) Assignees: STMICROELECTRONICS (GRENOBLE 2) SAS, Grenoble (FR); STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 278 days.

(21) Appl. No.: 14/928,091

(22) Filed: Oct. 30, 2015

(65) Prior Publication Data

US 2016/0291316 A1    Oct. 6, 2016

(30) Foreign Application Priority Data

Apr. 3, 2015   (FR) ...................... 15 52908

(51) Int. Cl.
G02B 26/06 (2006.01)
G01S 7/497 (2006.01)
G01S 7/486 (2006.01)
G01J 1/44 (2006.01)

(52) U.S. Cl.
CPC ............... *G02B 26/06* (2013.01); *G01J 1/44* (2013.01); *G01S 7/4865* (2013.01); *G01S 7/497* (2013.01); *G01J 2001/4466* (2013.01)

(58) Field of Classification Search
CPC ....... G02B 26/06; G01S 7/497; G01S 7/4865; G01S 17/102; G01J 1/44; G01J 2001/4466; G01J 2001/442; G01J 2001/444

See application file for complete search history.

(56) References Cited

U.S. PATENT DOCUMENTS

| | | | | |
|---|---|---|---|---|
| 7,636,150 B1* | 12/2009 | McCauley | ............ | G01S 7/4863 356/5.01 |
| 8,610,043 B2 | 12/2013 | Baxter | | |
| 9,213,085 B2* | 12/2015 | Kanter | .................. | G01S 7/4808 |
| 2011/0127415 A1* | 6/2011 | Kanter | ...................... | G01J 1/44 250/252.1 |
| 2013/0077082 A1* | 3/2013 | Mellot | .................... | G01S 17/36 356/4.01 |

(Continued)

FOREIGN PATENT DOCUMENTS

EP    2264481 A1    12/2010
FR    2980586 A1    3/2013

*Primary Examiner* — Que T Le
*Assistant Examiner* — Jennifer Bennett
(74) *Attorney, Agent, or Firm* — Slater Matsil, LLP

(57) ABSTRACT

A circuit may include a first circuit configured to generate a voltage signal for generating an optical pulse, the voltage signal being generated based on a phase control signal, and an array of single photon avalanche diode (SPAD) cells configured to detect a phase of the optical pulse. The circuit may include a phase control circuit configured to generate the phase control signal based upon a target phase value and the detected phase of the optical pulse.

15 Claims, 2 Drawing Sheets

(56) References Cited

U.S. PATENT DOCUMENTS

2013/0153754 A1* 6/2013 Drader ............... G01S 17/026
                                                    250/208.2
2014/0231630 A1   8/2014 Rae et al.

* cited by examiner

OPTICAL SIGNAL GENERATION IN A SPAD ARRAY BASED ON GENERATION OF A TARGET PHASE VALUE DEPENDENT UPON AN AMBIENT COUNT RATE

RELATED APPLICATION

This application is based upon prior filed copending French Application No. 1552908 filed Apr. 3, 2015, the entire subject matter of which is incorporated herein by reference in its entirety.

TECHNICAL FIELD

The present disclosure relates to the field of single photo avalanche diode (SPAD) arrays, and in particular to, a circuit and method for generating an optical signal.

BACKGROUND

SPAD arrays can be used for a variety of applications, including for ranging, for Z (i.e. depth detection) or three-dimensional (3D) gesture recognition and for 3D imaging. A device for such applications generally comprises a laser for transmitting a light pulse into an image scene. The light pulse reflected back from an object in the image scene is detected by the SPAD array, and used to determine the time of flight of the light pulse. The distance from the object to the device can then be deduced based on this time of flight.

The detection by the SPAD array of the returning light pulse is based on event detection in the cells of the SPAD array. In particular, each SPAD cell will provide an output pulse when a photon is detected, and by monitoring the events, the arrival time of the return pulse can be estimated.

SUMMARY

Generally speaking, a circuit may include a first circuit configured to generate a voltage signal (i.e. a drive signal) for generating an optical pulse. The voltage signal may be generated based on a phase control signal. The circuit may also comprise an array of SPAD cells configured to detect a phase of the optical pulse. The circuit may include a phase control circuit configured to generate the phase control signal based upon a target phase value and the detected phase of the optical pulse.

DETAILED DESCRIPTION

Throughout the present description, the term "connected" is used to designate a direct electrical connection between two elements. The term "coupled" is used to designate an electrical connection between two elements that may be direct, or may be via one or more other components such as resistors, capacitors or transistors. Furthermore, as used herein, the term "substantially" is used to designate a range of +/−10 percent of the value in question.

In typical approaches, a potential problem is that the precision of the determined time of flight estimation can be degraded by the timing of the light pulse. In an approach to this issue, a circuit may include a first circuit configured to generate a voltage signal for generating an optical pulse, the voltage signal being generated based on a phase control signal, an array of SPAD cells configured to detect the phase of the optical pulse, and a phase control circuit configured to generate the phase control signal based on a target phase and on the detected phase of the optical pulse.

The circuit may further comprise a second circuit configured to generate the target phase value based on an ambient count rate. The second circuit may comprise a look-up table. The second circuit may be configured to generate a first target phase value for a first ambient count rate, and a second target phase value, corresponding to a later timing of the optical pulse than the first target phase value, for a second ambient count rate higher than the first ambient count rate.

Also, the phase control signal may be a digital value, and the phase control circuit may be configured to compare the target phase value with the detected phase, and to increment or decrement the phase control signal based on the comparison. The first circuit may comprise a pulse generation circuit for generating a first signal having voltage pulses, and a variable delay circuit configured to apply a delay to the first signal as a function of the phase control signal in order to generate the voltage signal.

Additionally, the circuit may further comprise a driver for driving a light source to generate the optical pulse based on the voltage signal. The array of SPAD cells may comprise a reference SPAD array blinded from the image scene and configured to receive the optical pulse, and the circuit may further include another array of SPAD cells configured to receive the optical pulse returning from the image scene.

According to another aspect, a method may include generating, by a first circuit, a voltage signal for generating an optical pulse, the voltage signal being generated based on a phase control signal, and detecting the phase of the optical pulse by an array of SPAD cells. The method may include generating the phase control signal by a control circuit based on a target phase value and on the detected phase of the optical pulse.

Figure 1:
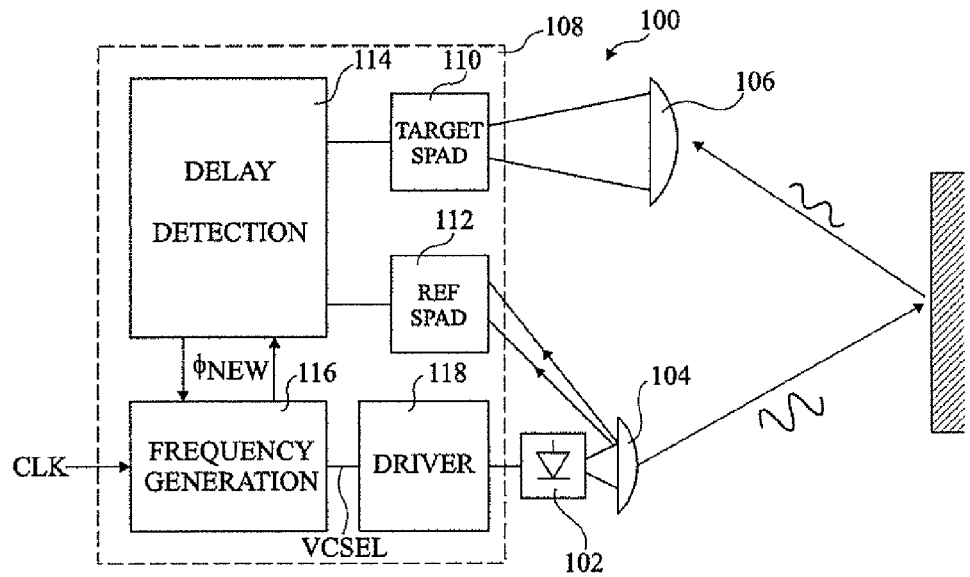
FIG. 1 is a schematic diagram of a SPAD device, according to an example embodiment of the present disclosure.

FIG. 1 shows a SPAD device 100, which is, for example, a ranging device, Z or 3D gesture recognition device, or 3D imaging device. The device 100 comprises a light source 102, which is, for example, a laser, for generating a beam of light pulses transmitted into an image scene, or example via a lens 104. The return light pulses are, for example, received via another lens 106.

The SPAD device 100 further comprises a detection circuit 108 for determining the distance between the device 100 and an object in the image scene against which the light pulses reflect. The detection circuit 108, for example, comprises a target SPAD array (TARGET SPAD) 110, which receives the return light pulses via the lens 106. The target SPAD array 110, for example, comprises an array of between four and several hundred SPAD cells. In one example, the array is a 12 by 12 array comprising 144 SPAD cells.

The detection circuit 108 also, for example, comprises a reference SPAD array (REF SPAD) 112, which is, for example, of the same dimensions as the target SPAD array 110, and receives an internal reflection of the transmitted light pulses. A delay detection circuit (DELAY DETECTION) 114 is, for example, coupled to the target SPAD array 110 and to the reference SPAD array 112, and estimates the delay between each transmitted light pulse and the return light pulse received by the target SPAD array 110. The detection circuit 108 also, for example, comprises a frequency generation circuit (FREQUENCY GENERATION) 116, which generates a voltage signal VCSEL provided to a driver (DRIVER) 118 for generating a signal for driving the light source 102. The signal VCSEL is, for example, generated based on a phase control signal φNEW generated by the delay detection circuit 114, as will be described in more detail below.

Figure 2:
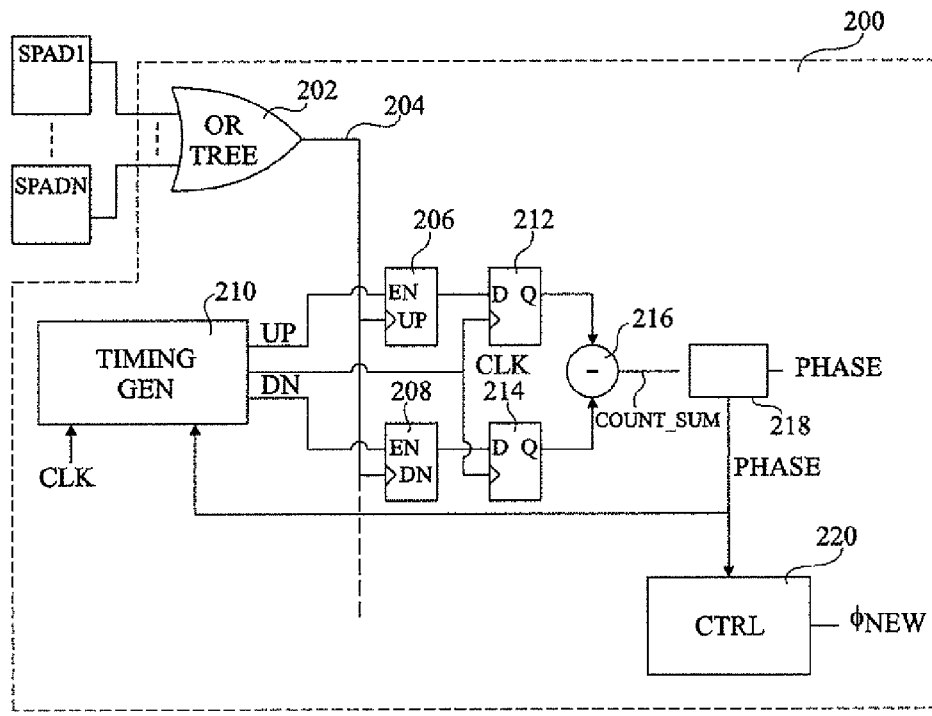
FIG. 2 is a schematic diagram of a delay detection circuit of FIG. 1 in more detail.

FIG. 2 shows a circuit 200 forming part of the delay detection circuit 114 of FIG. 1 according to an example embodiment. The circuit 200 receives signals from the cells of the reference SPAD array 112. A similar circuit is, for example, provided for receiving the signals from the cells of the target SPAD array 110.

The circuit 200, for example, comprises an OR tree (OR TREE) 202 having inputs respectively coupled to each of the SPAD cells SPAD1 to SPADN of the array 112, and providing, on its output line 204, pulses generated each time an event is detected by one of the SPAD cells. The output line 204 is coupled to counters for counting the detected events. In the example of FIG. 2, the output line 204 is coupled to the clock input of an up counter (UP) 206 and of a down counter (DN) 208. The up counter 206 is enabled during an up count period, based on a signal UP received from a timing generation circuit (TIMING GEN) 210, which receives a clock signal CLK. Similarly, the down counter 208 is enabled during a down count period, based on a signal ON received from the timing generation circuit 210. The output of the counter 206 is, for example, clocked by a flip-flop 212 based on the clock signal CLK, and the output of the counter 208 is, for example, clocked by a flip-flop 214 based on the clock signal CLK. A difference between the outputs of the flip-flops 212 and 214 is generated by a subtraction unit 216 to provide a signal COUNT_SUM. This signal is analyzed by an analysis circuit 218 in order to determine a phase to be applied by the timing generation circuit 210.

The circuit 200, for example, further comprises a phase control circuit (CTRL) 220 configured to generate the phase control signal φNEW based on the phase signal generated by the analysis circuit 218 and, in some embodiments, also based on an ambient rate. The ambient rate is, for example, a count rate detected based on the signal on line 204 at the output of the OR tree 202 while no optical pulse is transmitted.

The circuit of FIG. 2 provides an example implementation of a detection circuit for a SPAD array. It will however be apparent to those skilled in the art that the principles of the optical pulse generation method described herein after could be applied to different types of SPAD detection circuits.

Figure 3:
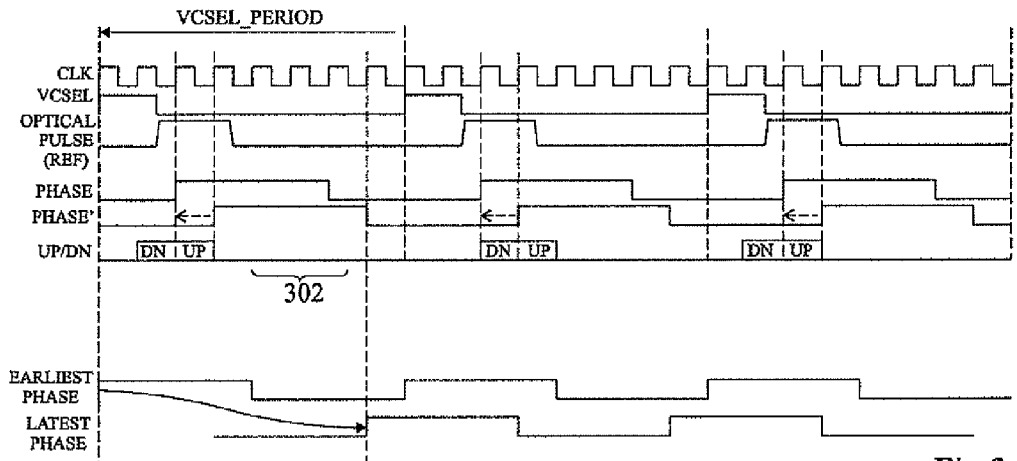
FIG. 3 is a timing diagram illustrating examples of signals in the circuit of FIG. 2.

FIG. 3 shows examples of the clock signal CLK provided to the timing generation circuit 210, the signal VCSEL, the form of the transmitted optical pulses as received by the reference SPAD array 112, the signals PHASE and PHASE' indicating the phase of the optical pulses as detected by the analysis circuit 218 of FIG. 2, the signal UP and DN generated by the timing generation circuit 210, an example of the earliest phase signal (EARLIEST PHASE), and an example of the latest phase signal (LATEST PHASE). In the example of FIG. 3, the period of the optical pulses, labeled VCSEL_PERIOD, is equal to eight periods of the clock signal CLK, although other values would be possible. The signal VCSEL, for example, has its pulse occurring during the first two clock periods of the clock CLK at the start of each VCSEL period. Of course, depending on the delay introduced by the driver 118 and the light source 102, the signal VCSEL could have a very different positioning, for example, occurring earlier than the start of the VCSEL period indicated in FIG. 3.

The phase signal has rising edges corresponding to the time instant at the cross-over between the down and up signals DN, UP, and as represented by the signals PHASE and PHASE', the phase value, for example, toggles between adjacent values. In the example of FIG. 3, the phase signal generated by the analysis circuit 218 indicates a phase of the optical pulse occurring between the third and fourth rising edges of the clock CLK during each VCSEL period. The phase value, for example, toggles between these values. For example, the timing generation circuit generates the signals DN and UP based on this phase signal, examples being shown in FIG. 3. These signals DN and UP together define a count window during which the counter 208 first counts detected events, and then the counter 206 counts detected events. In particular, the count value generated by the counter 208 will rise each time an event is detected while the signal DN is asserted, and the count value generated by the counter 206 will rise each time an event is detected while the signal UP is asserted. The unit 216 then generates the signal COUNT_SUM as the difference between these count values.

For example, the analysis circuit 218 integrates the signal COUNT_SUM. If the result of the integration goes above a first threshold, the phase signal is incremented in order to delay the count window defined by the signals DN and UP. If the result of the integration goes below a second threshold, the phase signal is decremented in order to bring forward the start of the count window defined by the signals DN and UP. By adjusting the start time of the count window, the number of events detected during the up and down periods UP, DN will be altered, and the phase will eventually toggle between two adjacent values which permit an average phase of the optical pulse to be deduced.

The rising edge of the phase signal PHASE has a minimum and maximum position based on the VCSEL period. In one example based on an optical pulse period of 8 clock periods, the earliest phase corresponds to the first rising clock edge of the VCSEL period, and the latest phase corresponds to the seventh rising clock edge of the VCSEL period. The final phase signal is generated by averaging the phase signals generated over a plurality of VCSEL periods. If the optical pulse is positioned outside of the minimum and maximum limits, the phase value will be clipped to a value within these limits, causing an offset in the final average phase value. The higher the signal and ambient rates, the more the phase position will tend to vary and the more likely it is that it will hit one of the limits.

It may be desirable that the optical pulse is positioned as early as possible during the VCSEL period without clipping occurring, in other words some headroom should be maintained with respect to the earliest phase. Indeed, as indicated by a period referenced 302 in FIG. 3, the phase range available for the return light pulse corresponds to the rising edges of the VCSEL period between the reference phase signal and the end of the VCSEL period. Therefore, in order to obtain a high dynamic range for the time of flight reading, it is preferable that the reference phase signal is early in the VCSEL period. Circuits for adjusting the phase of the optical pulse signal will now be described with reference to FIGS. 4 to 6.

Figure 4:
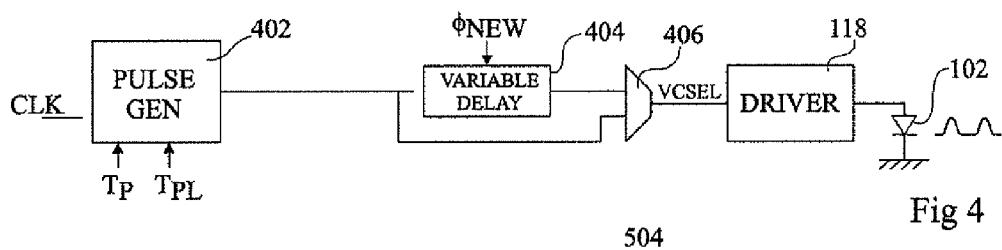
FIG. 4 is a schematic diagram of an optical pulse generation circuit, according to an example embodiment.

FIG. 4 shows the light pulse generation circuit. A pulse generation circuit (PULSE GEN) 402, for example, generates, based on the clock signal CLK, a voltage signal having pulses of a pulse length configured based on the length of the light pulses to be transmitted, and a period corresponding to the VCSEL period. For example, the pulse length is controlled by an input signal TPL to the circuit 402, and the period is controlled by an input signal TP to the circuit 402. The output voltage signal of the pulse generation circuit 402 is, for example, provided to a variable delay circuit (VARIABLE DELAY) 404, which receives the phase control signal φNEW, and delays the voltage signal by a time delay based on the signal φNEW. For example, the signal φNEW is a digital value in the range 1 to M, M being the number of discrete phase values in the VCSEL period. Each of the M values of the signal φNEW, for example, selects a different time delay, each time delay, for example, corresponding to a different number of periods of the clock signal CLK. Alternatively, in some embodiments, the delay increments can be smaller than the periods of the clock signal CLK, and could, for example, be analog delays.

In some embodiments, a multiplexer 406 is provided, thereby allowing the variable delay circuit 404 to be bypassed. For example, the multiplexer 406 has one input coupled to the output of the variable delay circuit 404, and its other input coupled directly to the output of the pulse generation circuit 402. The signal φNEW is, for example, generated based on a target phase and on an ambient rate, as will now be described with reference to FIG. 5.

Figure 5:
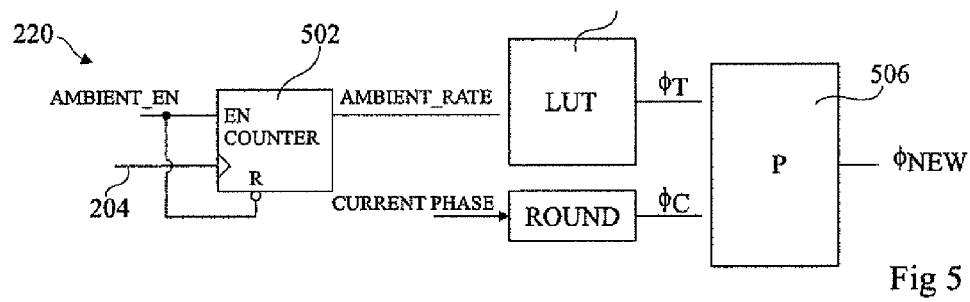
FIG. 5 is a schematic diagram of a phase control circuit, according to an example embodiment.

FIG. 5 shows the phase control circuit 220 according to an example embodiment. In the example of FIG. 5, the ambient rate is determined using the target SPAD array 110 of FIG. 1. For example, the ambient rate is determined by a counter (COUNTER) 502 having its clock input coupled to the line 204 at the output of the OR tree 202 that receives the signals from the target SPAD array 110. The counter 502 is, for example, enabled by an enable signal AMBIENT_EN, which is asserted during periods when no optical pulse is transmitted, such that events occurring under only ambient conditions can be measured. The output of the counter provides the ambient rate signal AMBIENT_RATE. The ambient rate signal is, for example, used to determine a target phase of the optical pulse.

In one example, under low ambient conditions, the target phase is selected to be relatively close to the start of the VCSEL period. Indeed, Applicant has found that under low ambient conditions, the spread in the phase measurements tends to be relatively low, and thus there is a reduced chance of clipping. However, under high ambient conditions, Applicant has found an increased spread in the phase measurements, and thus the target phase is, for example, selected to be further from the start of the VCSEL period. Such a selection will reduce dynamic range, but also reduce the risk of clipping.

For example, the target phase is provided by a lookup table (LUT) 504 based on the ambient rate. The LUT 504, for example, stores a plurality of optical phases, each associated with a corresponding ambient rate. The target phase φT is, for example, provided to a processing circuit (P) 506. The circuit 506, for example, compares the target phase 4T with a current phase φC of the optical pulse, and adapts the phase control signal φNEW accordingly. For example, the current phase φC corresponds to the phase provided by the analysis circuit 218 (CURRENT PHASE), rounded (ROUND) to the closest rising clock edge. An example of the method applied by the processing circuit 506 will now be described with reference to FIG. 6. This method may be implemented in hardware or software, or by a combination thereof.

Figure 6:
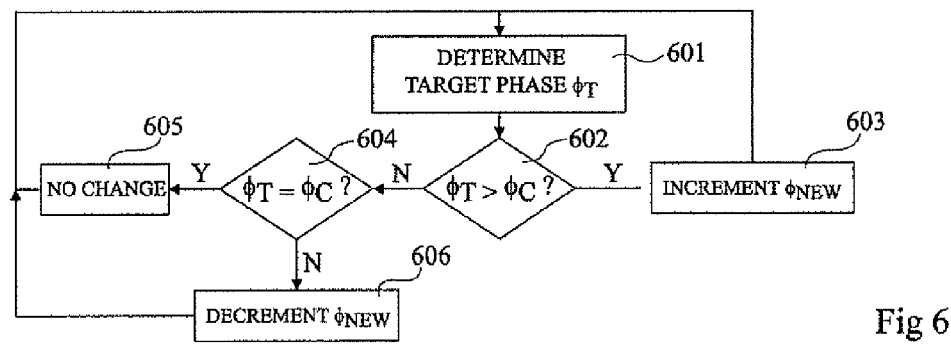
FIG. 6 is a flowchart illustrating a method for determining a phase offset to be applied to the optical signal, according to an example embodiment.

FIG. 6 shows operation in a method of determining the phase control signal φNEW. In a first operation 601 of the method, the target phase φT is determined, for example, using a LUT as described above with reference to FIG. 5. In some embodiments, the target phase could be a fixed value.

In an operation 602, it is determined whether the target phase φT is greater than the current phase φC. If so, the phase value φNEW is incremented in an operation 603. The method then, for example, returns to repeat operation 601 when a new current phase reading φC is available. Alternatively, if the target phase φT is not greater than the current phase φC, the next operation is 604.

In operation 604, it is determined whether the target phase φT and current phase φC are equal. If so, the next step is 605, in which the current value of the phase control signal φNEW is maintained. The method then, for example, returns to repeat operation 601 when a new current phase reading φC is available. Alternatively, if the phase values φC and φT are not equal in operation 604, the target phase φT must be lower than the current phase φC, and the phase value φNEW is decremented in an operation 606. The method then, for example, returns to repeat operation 601 when a new current phase reading φC is available. Of course it will be apparent to those skilled in the art that the method of FIG. 6 is merely one example, and many variations could be applied to this method, such as changing the order of the comparison operations 602 and 604.

An advantage of the embodiments described herein is that the positioning of an optical pulse within a detection period can be controlled in a simple fashion, thereby increasing the accuracy of the phase estimation process by avoiding clipping. Furthermore, by varying the target phase based on ambient light levels, the dynamic range of the device can be relatively high for the given ambient light conditions.

Having thus described at least one illustrative embodiment, various alterations, modifications and improvements will readily occur to those skilled in the art. For example, it will be apparent to those skilled in the art that embodiments have been described based on metal-oxide semiconductor (MOS) transistors, alternative embodiments could at least partially be based on other transistor technologies such as bipolar technology.

Furthermore, it will be apparent to those skilled in the art how the positive supply rail and ground rail in the various embodiments could be exchanged with each other, and that rather than a ground voltage, a different supply voltage level could be used, such as a negative voltage. Furthermore, it will be apparent to those skilled in the art that the various features described in relation to the various embodiments could be combined, in alternative embodiments, in any combination.

That which is claimed is:

1. A circuit comprising:
    a first circuit configured to generate a drive signal for generating an optical pulse, the drive signal being generated based on a phase control signal;
    an array of single photon avalanche diode (SPAD) cells configured to detect a phase of the optical pulse;
    a phase control circuit configured to generate the phase control signal based upon a target phase value and the detected phase of the optical pulse; and
    a second circuit configured to generate the target phase value based upon an ambient count rate, wherein the second circuit is further configured to generate:

a first target phase value for a first ambient count rate; and a second target phase value associated with a later timing of the optical pulse than a timing associated with the first target phase value, the second target phase value being for a second ambient count rate greater than the first ambient count rate.

2. The circuit of claim 1, wherein said second circuit comprise a look-up table.

3. The circuit of claim 1 wherein the phase control signal comprises a digital value; and wherein said phase control circuit is configured to compare the target phase value with the detected phase, and to change the phase control signal based upon the comparison.

4. The circuit of claim 1 wherein the first circuit comprises:
a pulse generation circuit configured to generate a first signal having a plurality of voltage pulses; and
a variable delay circuit configured to apply a delay to the first signal as a function of the phase control signal to generate the drive signal.

5. The circuit of claim 1 further comprising a light source, and a driver circuit coupled to said light source and configured to drive said light source to generate the optical pulse based upon the drive signal.

6. The circuit of claim 1 wherein said array of SPAD cells comprises a reference array of SPAD cells blinded from an image scene and configured to receive the optical pulse; and further comprising a signal return array of SPAD cells configured to receive the optical pulse returning from the image scene.

7. A circuit for determining a distance to an object in an image scene, the circuit comprising:
a first circuit configured to generate a drive signal for generating an optical pulse, the drive signal being generated based on a phase control signal;
a reference array of single photon avalanche diode (SPAD) cells being blinded from the image scene and configured to detect a phase of the optical pulse;
a signal return array of SPAD cells configured to receive the optical pulse returning from the image scene;
a second circuit configured to generate a target phase value based upon an ambient count rate; and
a phase control circuit configured to generate the phase control signal based upon the target phase value and the detected phase of the optical pulse, wherein the second circuit is configured to generate a first target phase value for a first ambient count rate and a second target phase value associated with a later timing of the optical pulse than a timing associated with the first target phase value, the second target phase value being for a second ambient count rate greater than the first ambient count rate.

8. The circuit of claim 7 wherein said second circuit comprise a look-up table.

9. The circuit of claim 7 wherein the phase control signal comprises a digital value; and wherein said phase control circuit is configured to compare the target phase value with the detected phase, and to change the phase control signal based upon the comparison.

10. The circuit of claim 7 wherein the first circuit comprises:
a pulse generation circuit configured to generate a first signal having a plurality of voltage pulses; and
a variable delay circuit configured to apply a delay to the first signal as a function of the phase control signal to generate the drive signal.

11. The circuit of claim 7 further comprising a light source, and a driver circuit coupled to said light source and configured to drive said light source to generate the optical pulse based upon the drive signal.

12. A method of operating a device, the method comprising:
operating a first circuit to generate a drive signal for generating an optical pulse, the drive signal being generated based on a phase control signal;
operating an array of single photon avalanche diode (SPAD) cells to detect a phase of the optical pulse;
operating a phase control circuit to generate the phase control signal based upon a target phase value and the detected phase of the optical pulse; and
operating a second circuit to generate the target phase value based upon an ambient count rate by operating the second circuit to generate:
a first target phase value for a first ambient count rate; and
a second target phase value associated with a later timing of the optical pulse than a timing associated with the first target phase value, the second target phase value being for a second ambient count rate greater than the first ambient count rate.

13. The method of claim 12 wherein the phase control signal comprises a digital value; and further comprising operating the phase control circuit to compare the target phase value with the detected phase, and to change the phase control signal based upon the comparison.

14. The method of claim 12 further comprising:
operating a pulse generation circuit in the first circuit to generate a first signal having a plurality of voltage pulses; and
operating a variable delay circuit in the first circuit to apply a delay to the first signal as a function of the phase control signal to generate the drive signal.

15. The method of claim 12 further comprising operating a driver circuit coupled to a light source and to drive the light source to generate the optical pulse based upon the drive signal.

* * * * *